(12) United States Patent
Buff

(10) Patent No.: US 10,018,288 B2
(45) Date of Patent: Jul. 10, 2018

(54) SUBSURFACE PRESSURIZED IRRIGATION DELIVERY SYSTEM

(71) Applicant: Robbie A. Buff, Apply Valley, CA (US)

(72) Inventor: Robbie A. Buff, Apply Valley, CA (US)

(*) Notice: Subject to any disclaimer, the term of this patent is extended or adjusted under 35 U.S.C. 154(b) by 133 days.

(21) Appl. No.: 15/069,180

(22) Filed: Mar. 14, 2016

(65) Prior Publication Data

US 2016/0286739 A1    Oct. 6, 2016

Related U.S. Application Data

(60) Provisional application No. 62/133,592, filed on Mar. 16, 2015.

(51) Int. Cl.
| | |
|---|---|
| B05B 15/00 | (2018.01) |
| F16L 9/19 | (2006.01) |
| B05B 1/20 | (2006.01) |
| B05B 9/04 | (2006.01) |
| A01G 25/02 | (2006.01) |
| F16L 9/00 | (2006.01) |
| F16L 55/027 | (2006.01) |
| A01G 25/06 | (2006.01) |

(52) U.S. Cl.
CPC .............. *F16L 9/19* (2013.01); *A01G 25/023* (2013.01); *A01G 25/06* (2013.01); *B05B 1/20* (2013.01); *B05B 9/0423* (2013.01); *F16L 9/006* (2013.01); *F16L 55/027* (2013.01)

(58) Field of Classification Search
CPC .......... F16L 9/19; F16L 9/006; F16L 55/027; A01G 25/06; A01G 25/023; B05B 9/0423; B05B 15/069; B05B 1/20

USPC .................. 239/76, 450, 542, 547, 566–568
See application file for complete search history.

(56) References Cited

U.S. PATENT DOCUMENTS

| | | | | | |
|---|---|---|---|---|---|
| 3,539,106 | A | * | 11/1970 | Ramik | ...................... B05B 1/20 239/450 |
| 3,866,833 | A | * | 2/1975 | Shibata | ................... A01G 25/02 239/547 |
| 3,874,598 | A | * | 4/1975 | Havens | ................... A01G 25/06 239/542 |
| 4,235,380 | A | * | 11/1980 | Delmer | ................... A01G 25/02 239/450 |

* cited by examiner

*Primary Examiner* — Steven J Ganey
(74) *Attorney, Agent, or Firm* — Averill & Green; Kenneth L. Green

(57) ABSTRACT

An underground irrigation or piping system for water or fertilizing adjacent soil. The irrigation or piping system may be a horizontal system or a vertical system. A pipe contains a first, larger cavity and a second smaller cavity. Water or other fluids may flow from the first cavity to the second cavity, through a transfer port or via a vortex created by a restriction within a coupling or other element of the system. As the fluid transfers from the first cavity to the second cavity, it obtains a higher pressure. Emitters, such as holes) in the pipe that communicate with the second opening allow the pressurized fluid to spray out of the pipe a predetermined distance. Nutrients, air, or other elements may be added in the system to further fertilize or encourage vegetation growth.

20 Claims, 16 Drawing Sheets

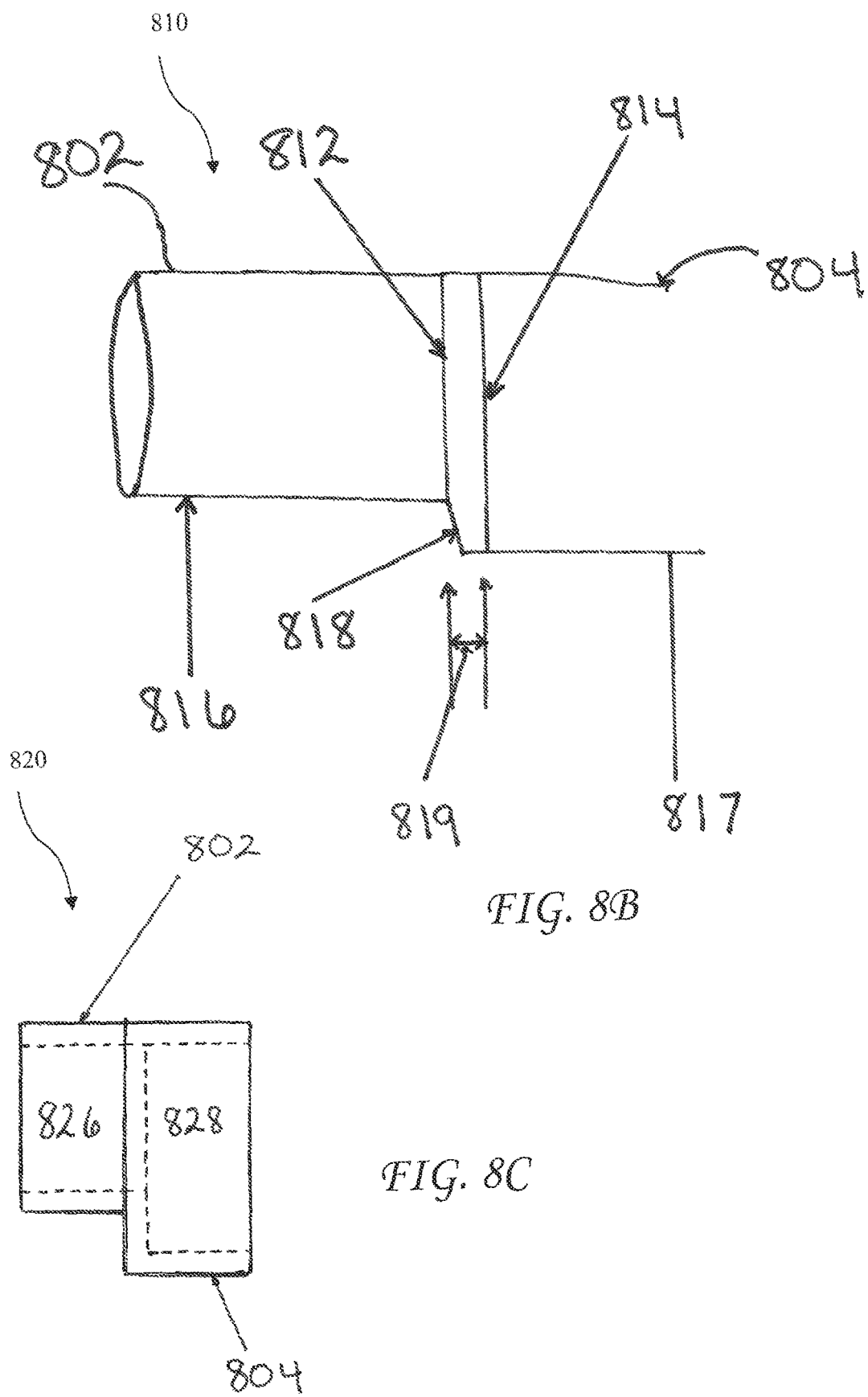

SUBSURFACE PRESSURIZED IRRIGATION DELIVERY SYSTEM

The present application claims the priority of U.S. Provisional Patent Application Ser. No. 62/133,592 filed Mar. 16, 2016, which application is incorporated in its entirety herein by reference.

BACKGROUND

1. Field of the Invention

The present invention relates to a method and system for a piping or an irrigation system. More particularly, the present invention relates to a method and system for an underground irrigation system that delivers a pressurized fluid to surrounding soil.

2. Description of the Related Art

Irrigation technology has become increasingly important for growers of crops or other vegetation, especially in geographic locations where water is at premium due to drought or other circumstance where water is limited. Above-ground irrigation can not only cause waste of water from spray at non-ideal locations (e.g., a sprinkler that deposits water on top of objects that do not require watering) or that cannot be positioned appropriately to irrigate the precise vegetation intended, but also suffers from water or fluid loss due to wind, run-off, evaporation, and other environmental conditions. Particularly as water becomes a more precious resource and as world population increases with food supply shrinking, it has become even more important for irrigation to be more efficiently performed.

A system is desired that efficiently delivers water or other fluids, with or without additional elements, such as air or nutrients, directly where it is needed most by vegetation and without the above-mentioned drawbacks or waste. Such a system would desirably be configured to deliver water, without significant waste, to the roots of desired vegetation and promote growth with as little wasted water and/or other nutrients as possible. The system would desirably be inexpensive to manufacture and easy to install at commercial or residential locations.

SUMMARY

The present invention is related to a method and system for a subsurface pressurized irrigation delivery system. In one embodiment, an apparatus for irrigating soil with water may include a first pipe for flowing the water therethrough, a second pipe positioned adjacent to the first pipe, a third pipe connected around the first pipe and the second pipe for maintaining the first pipe within a predetermined distance from the second pipe. Moreover, the apparatus may include a coupler configured to engage with a first end of the third pipe and having a ridge configured to make contact with the first end of the third pipe and a wall having an opening therein, the opening configured to allow water to flow therethrough, wherein water in the first pipe is configured to flow into the coupler and through the opening of the wall in order to flow into the second pipe.

In another embodiment, an apparatus for irrigating soil may include a pipe having a first cavity and a second cavity, the second cavity smaller in size than the first cavity, a plurality of openings in the pipe and in communication with the second cavity, and a transfer port in communication with the first cavity and the second cavity for transfer of a fluid between the first cavity and the second cavity.

BRIEF DESCRIPTION OF THE DRAWINGS

The features, objects, and advantages of the present invention will become more apparent from the detailed description set forth below when taken in conjunction with the drawings, wherein:

FIG. 8B shows a side view of the system adapter of FIG. 8A, according to one embodiment of the present invention;

FIG. 8C shows a diagram side view of the system adapter of FIG. 8A, according to one embodiment of the present invention;

DETAILED DESCRIPTION

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
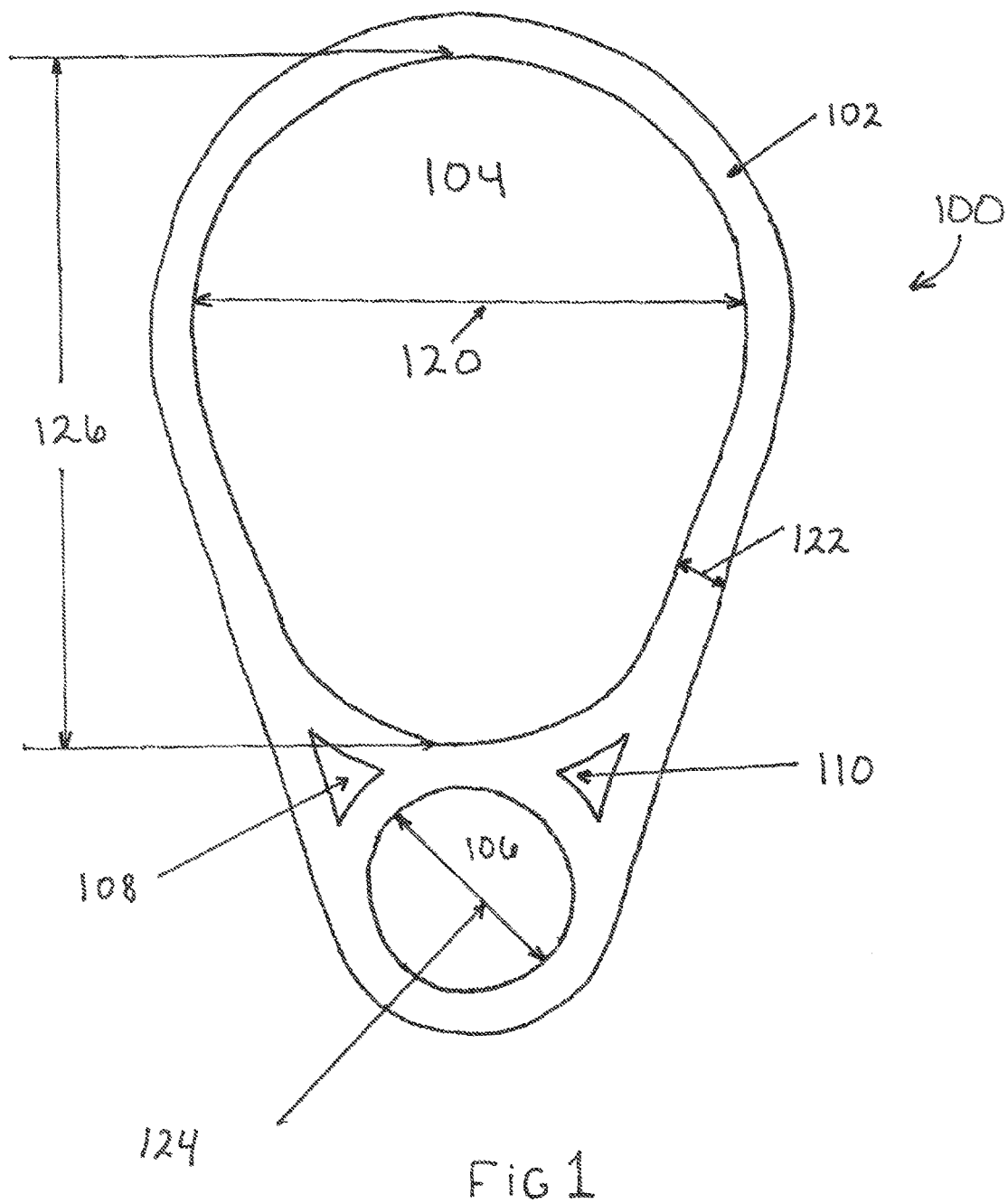
FIG. 1 shows a cross-sectional view of a pipe having a plurality of cavities therein, according to one embodiment of the present invention.

Turning first to FIG. 1, a cross-sectional view 100 of a pipe 102 having a plurality of cavities therein is shown. In one embodiment, the pipe 102 may be used for underground irrigation (e.g., placed underground and configured to flow water or other fluid therethrough and subsequently expel the water or fluid therefrom). A first cavity 104 is positioned adjacent (e.g., above) a second cavity 106. The first cavity 104 may be larger in diameter or size than the second cavity 106 (e.g., in one embodiment, may be 1.250 inches high and 1 inch at its widest point) and, as discussed in greater detail throughout, may be used as a reservoir for flowing water. The second cavity 106 may, in one embodiment, be round in shape and have a diameter of 0.375 inches and, as discussed in greater detail throughout, may be used as a delivery tube for flowing and expelling water. The pipe 102 may be formed as one component having the first cavity 104 and the second cavity 106 or may be formed as a plurality of distinct pipes that are fused or otherwise connected together, for example, as shown in more detail in FIG. 2.

In one embodiment, the first cavity may be egg-shaped and have a length 126 and a width 120. The second cavity 106 may be circular in size and have a diameter 124 that is less than the width 120 across the first cavity 104. As discussed in greater detail herein, such a configuration may cause pressurized fluid to flow from the first cavity 104 to the second cavity 106 where it is subsequently expelled from the pipe 102. Alternative embodiments may use any of a variety of lengths, widths, shapes, or other configurations for either the first cavity 104 and/or the second cavity 106. A first opening or rib 108 and a second opening or rib 110 are disposed adjacent to the first cavity 104 and/or the second cavity 106. The use of the ribs (108, 110) may help prevent failure of the pipe 102 during pressurized operation since it allows for a flat sidewall between the first cavity 104 and the second cavity 106 for sealing of the vortex (discussed in greater detail herein).

In one embodiment, the features and/or concepts discussed above and as further discussed herein may be used in a system for delivering water, air and nutrients into a root zone of vegetation. For example, such a system may be designed as a two pipe system bonded together by a third pipe (see FIG. 2 and its associated discussion, below). In one embodiment, such a system may use standard water pressure to create a power jet spray right in the root zone which is 4 to 6 inches under the surface. The water may be configured to drain from the system after every watering cycle. Upon a subsequent watering cycle, the system may be configured to push air through the system and out the watering holes into the root zone to help aerate the subsurface.

A top pipe in the two pipe system may supply volume to the lower delivery pipe. The pipes may be two different sizes in one embodiment to facilitate in increase in water (or other fluid) pressure of the water or fluid in the lower delivery pipe. The top pipe may be oval or egg-shaped and/or contain no seams. Similarly, the bottom pipe may be round or circular in shape and/or contain no seams. Such a system having two different volumes may create a differential pressure that can lead to a uniformity in water distribution emitted from the lower delivery pipe.

Figure 2:
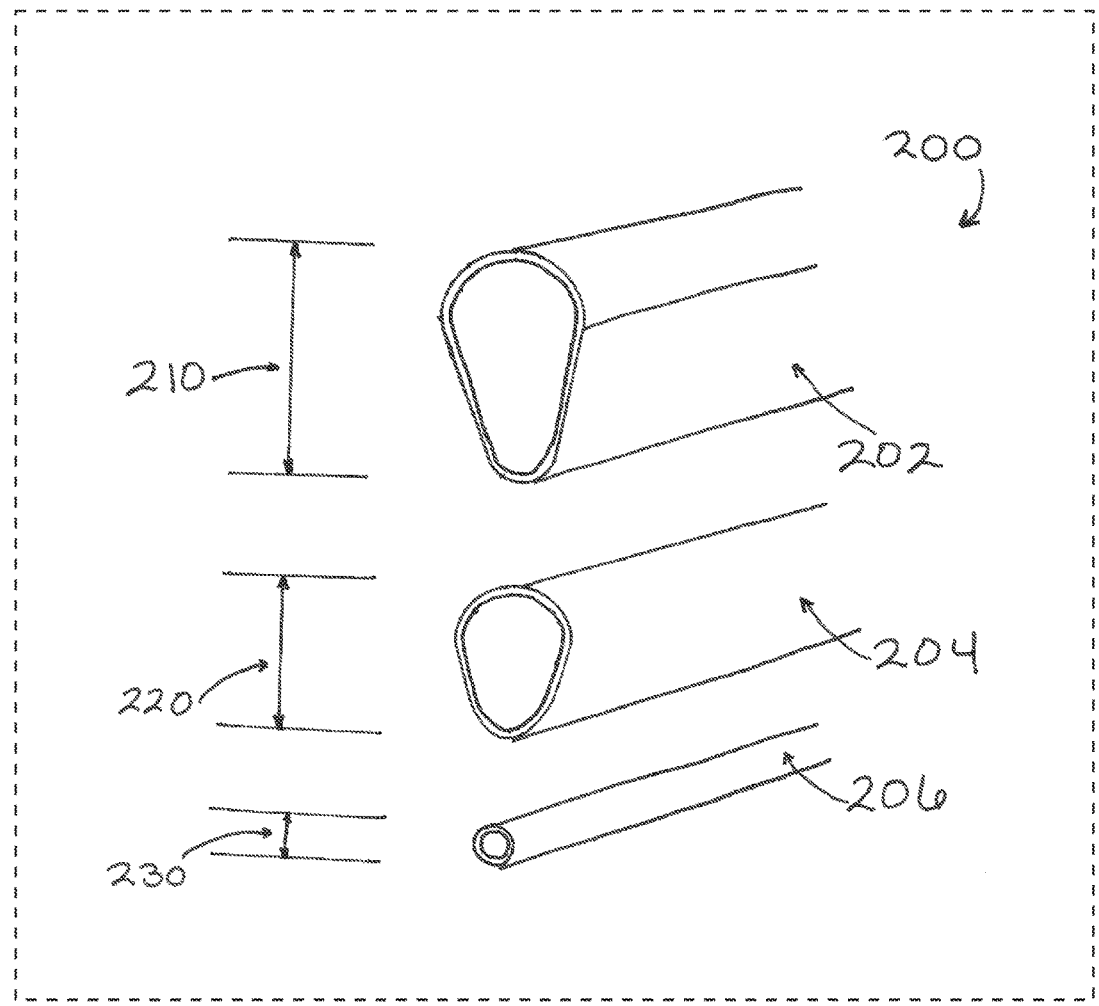
FIG. 2 shows an expanded view of the formation of a pipe having a plurality of cavities therein, according to one embodiment of the present invention.

Turning next to FIG. 2, an expanded view 200 of a formation of a pipe having a plurality of cavities therein is shown. A first pipe 202 (e.g., a binder pipe) may be used to form an outer surface or shell that contains two additional pipes disposed therein. As illustrated, the first pipe 202 may have an egg-shape. In an alternative embodiment, any of a variety of different shapes or configurations may be used for the first pipe 202. As previously discussed for FIG. 1, the use of the first pipe 202 with additional pipes disposed within (see discussion below) may allow for a final pipe to be constructed that has at least 2 cavities disposed inside.

A second pipe 204 (e.g., a reservoir pipe) may have an egg-shape and configured to fit within the first pipe 202. Similarly, a third pipe 206 (e.g., a delivery pipe or tube) may have a circular shape and configured to also fit within the first pipe 202, for example, below the second pipe 204. As discussed in more detail herein, the second pipe 204 may be used to flow a pressurized fluid (e.g., water) to the third pipe for subsequent delivery outside of the third pipe 206 and the first pipe 202 via spraying from a delivery hole or opening. The first pipe 202 may have a height 210 that is large enough to fit both the second pipe 204 (having a height 220) and the third pipe 206 (having a height 230) within. By binding the second pipe 204 and the third pipe 206 together with the first pipe 202, a curvature is formed where the second pipe 204 meets the third pipe 206 and may strengthen the sidewall instead of using a seam, which may cause problems during operation under pressure.

Figure 3:
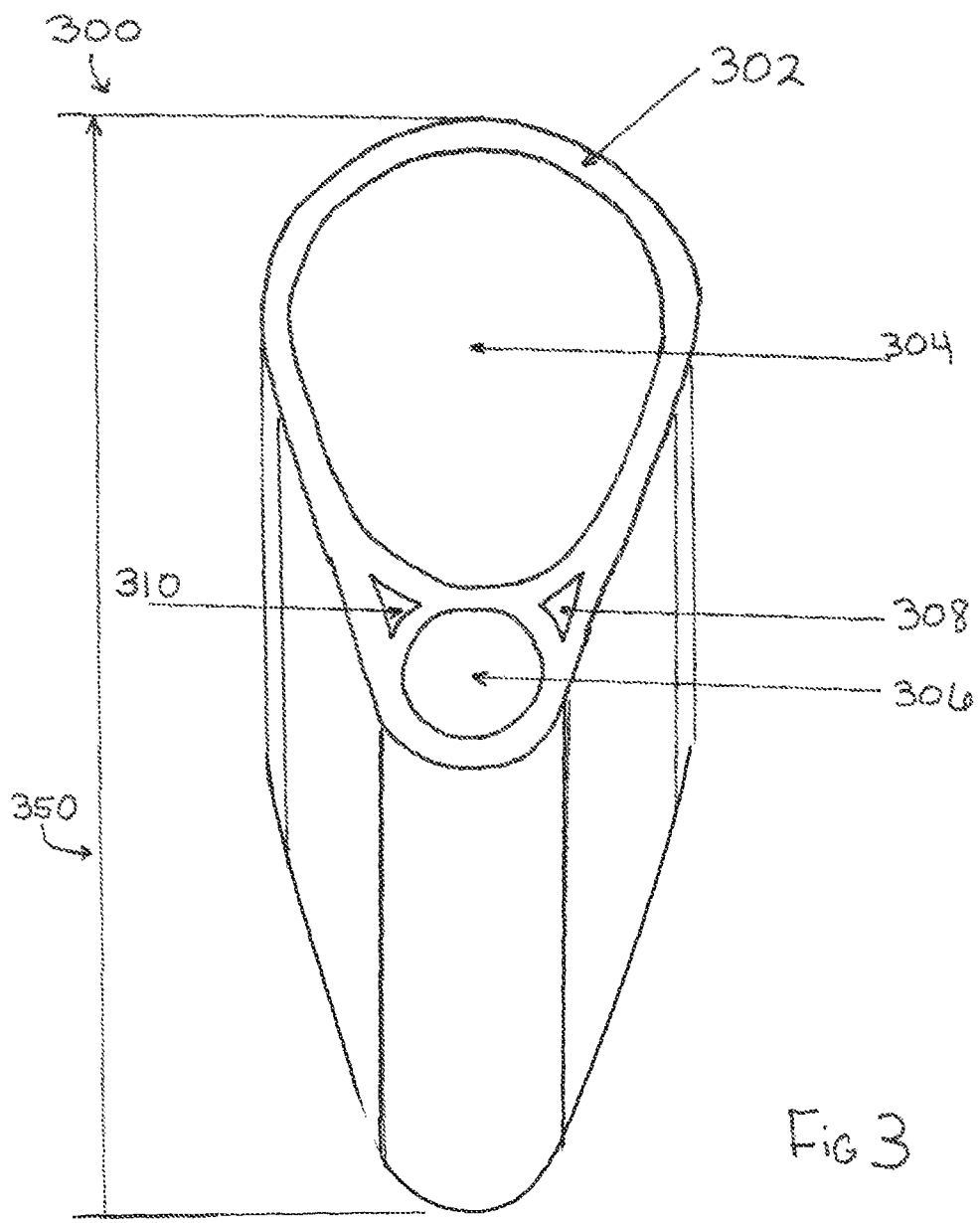
FIG. 3 shows a perspective view of a pipe having a plurality of cavities therein, according to one embodiment of the present invention.

FIG. 3 shows a perspective view 300 of a pipe 302 having a plurality of cavities disposed therein. The pipe 302 may include features that are the same as or similar to those previously discussed. The pipe 302 may have a length 350 that is any of a variety of distances and/or may be made out of any of a variety of materials (e.g., PVC) and may be formed via the combination of three pipes (e.g., as previously discussed for FIG. 2). In certain embodiments, the pipe 302 may have a length 350 that is adjustable (e.g., a telescoping construction). Thus, the pipe 302 has a first cavity 304 and a second cavity 306. The first cavity 304 may be larger in size than the second cavity 306, for example, so that a pressurized fluid (e.g., water) is caused to flow from the first cavity 304 to the second cavity 306 and subsequently expelled from the pipe 302.

A plurality of ribs or openings (308, 310) may be disposed adjacent to the first cavity 304 and/or the second cavity 306. For example, the ribs or openings (308, 310) may be formed due to the combination of a second pipe (e.g., making up the first cavity 304) and a third pipe (e.g., making up the second cavity 306) be placed adjacent to one another and surrounded by a first pipe in order to form the final pipe 302 that has two cavities (304, 306) disposed therein. The ribs or opening (308, 310) may help reduce cost of the pipe 302 due to the lower amount of material needed for manufacturing the pipe 302 and/or may aid in the structural strengthening of the pipe 302. In an alternative embodiment, these ribs or openings (308, 310) may be filled in with a same, or different material, from what makes up the pipe 302 (e.g., PVC). In still another embodiment, greater or fewer openings may be included as part of the pipe 302.

In use, the pipe 302 may be used as an underground or subsurface irrigation system. For example, one end of the pipe 302 may fit with additional components or itself be configured to engage with a pressurized or un-pressurized fluid source (e.g., water). Fluid from the source flows through the first cavity 304 until reaching a connection component that join the pipe 302 with a second pipe, for example, also containing a first and second cavity in the same or similar configuration to the pipe 302. As discussed in greater detail herein, as the fluid enters the connection component, the fluid is permitted to flow from the first cavity 304 to the second cavity 306 and/or to one of the cavities of the second pipe that is connected with the pipe 302. This fluid is then permitted to be expelled from the second cavity 306 (e.g., via holes or other openings in the pipe 302 that communicate with the second cavity 306).

For example, the fluid may be caused to spray a jet of pressurized fluid (e.g., water) out of the pipe 302 via delivery holes that provide an exit for fluid that is flowing within the second cavity 306. In one embodiment, the differential pressure between the first cavity 304 and the second cavity 306 determines the distance that the fluid may be expelled from the second cavity 306. Based upon the pressure of the fluid within the second cavity 306, this fluid may be caused to shoot any of a variety of distances outward from the pipe 302. In this fashion, a large area of land may be irrigated, fertilized, or otherwise soaked with the fluid that is expelled from the second cavity 306 of the pipe 302.

In one embodiment, the pipe 302 may have a v-shape (or similar shape, such as an egg-shape) such that water is promoted to drain from the pipe 302 when not in operation. For example, if a fluid source flowing water to the pipe 302 is turned off, a v-shape (e.g., and along with a larger volume for a top cavity) helps drain the remaining fluid in the pipe 302 out of the emitters and into the adjacent soil or environment outside of the pipe 302.

As mentioned, in one embodiment, such a pipe 302 may be used in an irrigation system and may be constructed, as illustrated, to have no seam where a tube forming an upper cavity and a tube forming a lower cavity meet. This may provide additional structural strengthening under high pressure. Further, in certain embodiments, the sides of the cavities of the pipe 302 sides where the water flows may be curved so as to reduce risk of splitting under pressure. This may be accomplished by having a third binder pipe built into an extrusion dye that binds the two upper and lower pipes together during manufacturing (see, e.g., FIG. 2). This third outer binder pipe may allow for structural strengthening where the upper and lower pipes come together and may allow for curvature on the sides where water flows, for example, via the ribs or openings (308, 310).

The third binder pipe (e.g., built into the dye) may help prevent the formation of a seam or other flat ledge where the upper and lower pipes come together, reducing risk of splitting under operating pressures. In certain embodiments, the walls of two or more of the pipes used to form the pipe 302 may have the same thickness, aiding in reducing twisting and/or pulling of the extrusion and/or creation of uneven wall thickness.

In certain embodiments, a flexible version of the pipe 302 and/or other components mentioned throughout may be created for irrigation purposes or for delivery of fluids. In one example, such a version may have components made of poly urethane. In one embodiment, such a version may be manufactured as one continues roll of flexible piping and/or tubing containing a transfer port connected between a larger cavity in the tubing to a smaller cavity in the tubing. The smaller cavity in the tubing may be the delivery tube which subsequently expels the fluid (e.g., water) from the flexible piping in order to irrigate surrounding soil. In one embodiment, a transfer port may be placed every 10 feet along a length of the flexible piping and/or tubing and/or may be 0.400 inches. Once inside the smaller cavity, the fluid may pass through a restriction (e.g., a small hole or emitter) that causes the water to shoot out (e.g., jet spray). In one embodiment, this restriction hole or emitter may be placed every 12 inches along the delivery tube and/or placed on both sides of the delivery tube.

Certain embodiments may utilize anchoring components (e.g., plastic pins) that are engaged with the delivery tube and/or other piping or components in order to keep the system in a specified orientation underground. In one example, the anchoring components may have a hook at one end to go over the top or the piping and hold the system in place to make sure it does not twist during the application.

Figure 4:
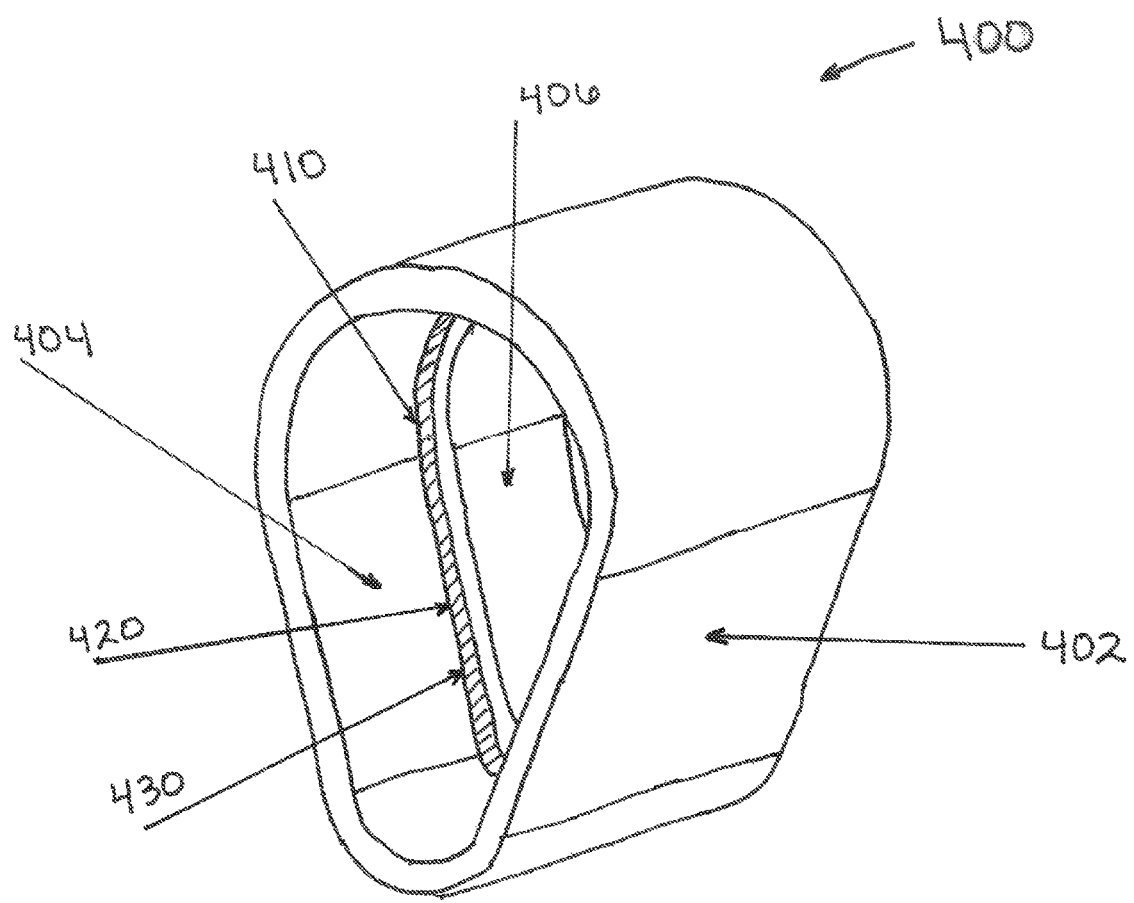
FIG. 4 shows a perspective view of a coupler for joining two pipes together, according to one embodiment of the present invention.

FIG. 4 shows a perspective view 400 of one embodiment of a coupler or connection component 402 for joining two pipes together. For example, the coupler or connection component 402 may include features that are the same as or similar to those discussed above in FIG. 3. As previously mentioned, the two pipes being joined or mated by the coupler or connection component 402 may each and/or both be a pipe with two cavities therein (e.g., pipe 302).

The coupler or connection component 402 includes a first interior surface 404 and a second interior surface 406 separated by a ridge 410. In one embodiment, the ridge may be an outwardly extending surface that protrudes from the first interior surface 404 and/or the second interior surface 406 by a distance 420 and has a width 430. Any of a variety of distances for the distance 420 or widths for the width 430 may be used in alternative embodiments.

In use, the coupler or connection component 402 slides over a first pipe (not shown) such that the first interior surface 404 makes contact with an outer surface of the first pipe. Similarly, the coupler or connection component 402 slides over a second pipe (not shown) such that the second interior surface 406 makes contact with an outer surface of the second pipe. Thus, the first pipe and the second pipe are caused to be connected together via the coupler or connection component 402. The ridge 410 keeps the first pipe and the second pipe from directly contacting one another by offsetting them the width 430 of the ridge 410. At this offset, fluid (such as water) may be allowed to flow from one cavity of the first pipe to a second cavity of the second pipe, as discussed in further detail herein. Thus, for example, it is at this connection point where a fluid may be caused to transfer from a larger cavity (e.g., cavity 304 of FIG. 3) to a smaller cavity (e.g., cavity 306 of FIG. 3).

In one embodiment, the coupler or connection component 402 may be 2.250 inches in length and have a ridge 410 that is 0.070 inches high and 0.400 wide. Using such a configuration, for example, a fluid such as water may transfer from the larger, top cavity in a pipe to a smaller, bottom cavity of the pipe via the coupler or connection component 402 through a 0.400 inch restrictive port that is in communication with the delivery tube (e.g., 0.375 inches). This step down from 0.400 inches to 0.375 inches may cause the water flow to speed up before being ejected by emitters out of the delivery tube. In one embodiment, the coupler or connection component 402 may have a telescoping first interior surface 404 and/or second interior surface 406 to help prevent leakage out of the coupler or connection component 402.

Figure 5:
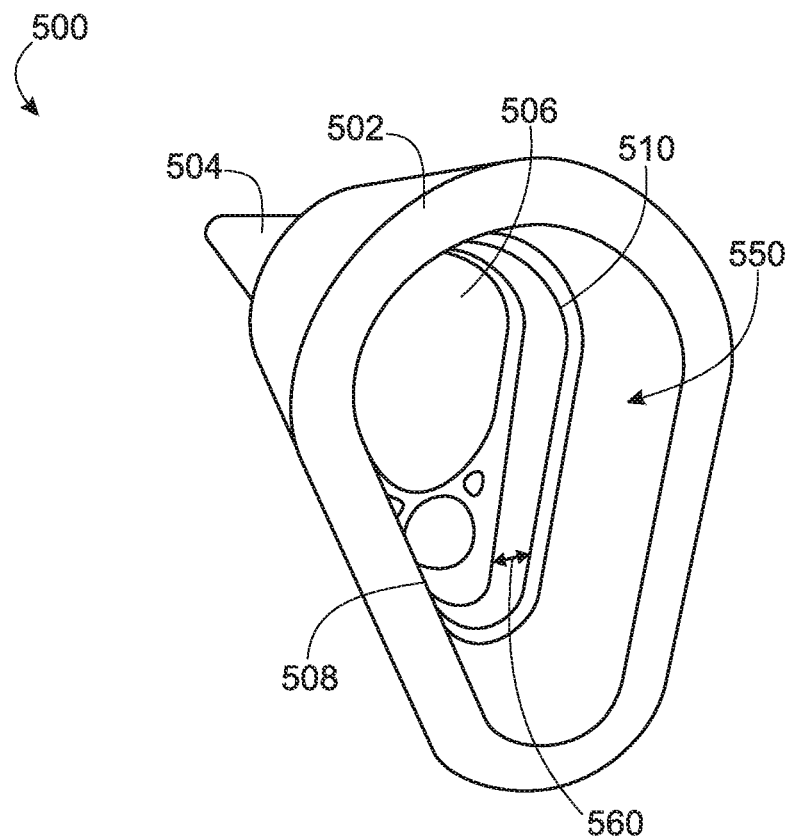
FIG. 5 shows a perspective view of a coupler joined with a pipe, according to one embodiment of the present invention.

FIG. 5 shows a perspective view 500 of a pipe 504 connected with a coupler or connection component 502. The pipe 504 and/or the coupler or connection component 502 may include features that are the same as or similar to those previously discussed. As illustrated, the pipe 504 is only permitted to slide a partial distance into the coupler or connection component 502 because being stopped by the ridge 510. The ridge has a width 560 separating the pipe 504 from a second pipe (not shown) that is configured to slide into the other end 550 of the coupler or connection component 502. Thus, for the width 560 of the ridge 510, fluid is permitted to flow from one cavity 506 of the pipe 504 to the second cavity 508 of the pipe 504 and/or to one or more cavities of the second pipe (not shown).

Figure 6A:
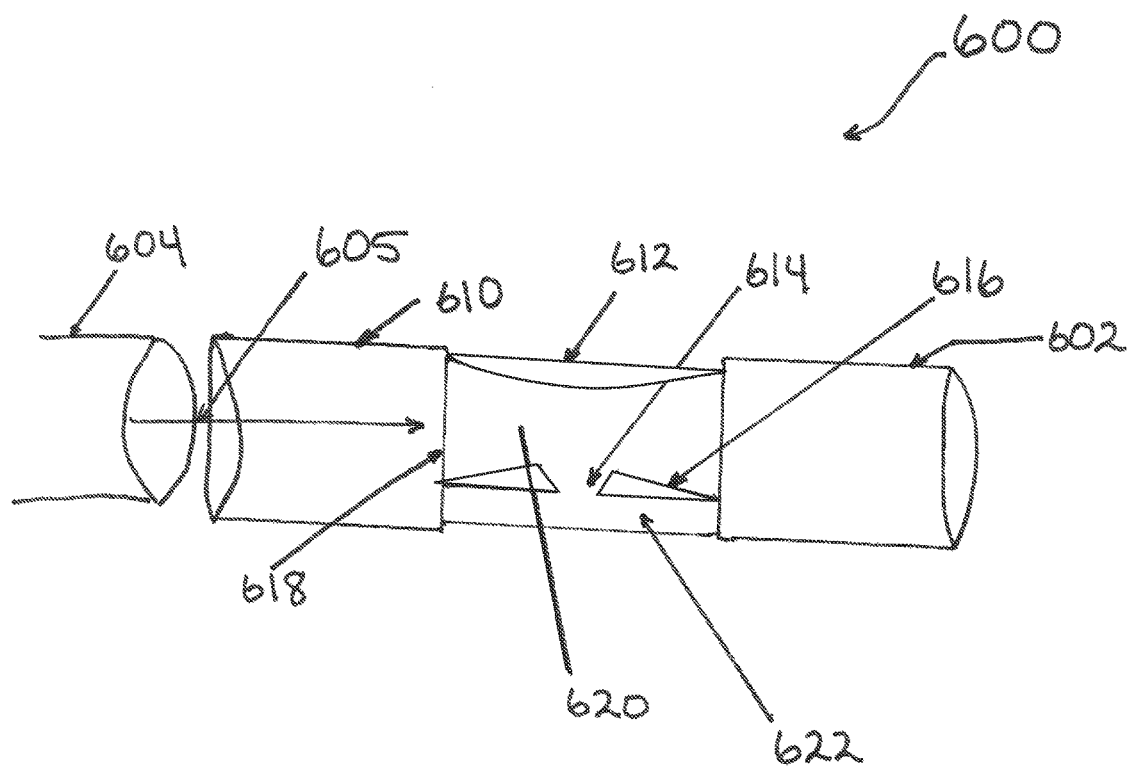
FIG. 6A shows a side view of a coupler for joining two pipes together, according to one embodiment of the present invention.

FIG. 6A shows a side view 600 of a pipe 604 in the process of connecting 605 with a coupler or connection component 602. Although not illustrated, a second pipe may then be allowed to connect or mate with a second end of the coupler or connection component 602 so as to form a longer length of pipe with a connection component disposed therebetween. The pipe 604 and/or the coupler or connection component 602 may include features that are the same as or similar to those previously discussed.

The coupler or connection component 602 has a sleeve 610 that is shaped to connect 605 with the pipe 604 and slide along the pipe 604 until the pipe 604 makes contact with a ridge or ridge stop 618. In one embodiment, the ridge stop 618 extends for a predetermined distance until a second sleeve is encountered at a second end of the coupler or connection component 602, thus forming a shared area for any fluid that is flowing from the first pipe 604 into the coupler or connection component 602.

In one embodiment, a riser 612 or other elevated or sloped surface is formed along a portion of the shared wall. Likewise, one or more of a shared wall 616 may be disposed along the ridge stop 618 for aiding in the direction of fluid from an upper tube coupler area 620 to a lower tube coupler area 622. Thus, as fluid flows from the first pipe 604 into the coupler or connection component 602 (e.g., via a larger cavity in the pipe 604), this fluid is configured to form a vortex 614 and flow at a higher pressure into and through the first pipe 604 and/or a second pipe (e.g., via a smaller cavity in the pipe 604). While flowing at this higher pressure due to the lower volume of the smaller cavity, the fluid is configured to be ejected from the pipe 604 at a high pressure and travel a greater distance or be capable of breaking through soil or other material in which the pipe 604 is buried. The riser 612, shared wall 616, and/or corresponding vortex 614 of fluid created by such elements in use may help prevent the fluid from flowing back from the smaller cavity of the pipe 604 to the larger cavity of the pipe 604. For example, the shared wall 616 may narrow down from the beginning of the vortex 614 union until the middle of the vortex 614 in order to create a restriction and subsequent rise in pressure of fluid flowing therethrough.

As mentioned above, the corresponding vortex 614 not only results in transfer of fluid, but may also increase the pressure of the fluid when it is flowing within the smaller cavity of the pipe 604. The riser 612 and/or the shared walls 616 may be created as one continuous component that narrows down in order to create the restriction through which the fluid flows through to transfer from the upper tube coupler area 620 to the lower tube coupler area 622 at the creation of the vortex 614. This restriction may, in one embodiment, cause a rise in fluid pressure and/or force the fluid into the vortex at the shared wall 616 at a higher rate of flow Thus, the vortex 614 not only transfers fluid between cavities or chambers of a pipe, but also further increases pressure of the fluid when in one of the cavities (e.g., the delivery tube or cavity) for subsequent expelling from the pipe. For example, the rider 612 may rise a given distance (e.g., 3/16 of an inch) and have a 45 degree down grade into the opening of the shared wall 616 where the vortex 614 is formed. In one embodiment, the rider may be on both sides of the opening of the shared wall 616 between the top and bottom chambers.

Figure 6B:
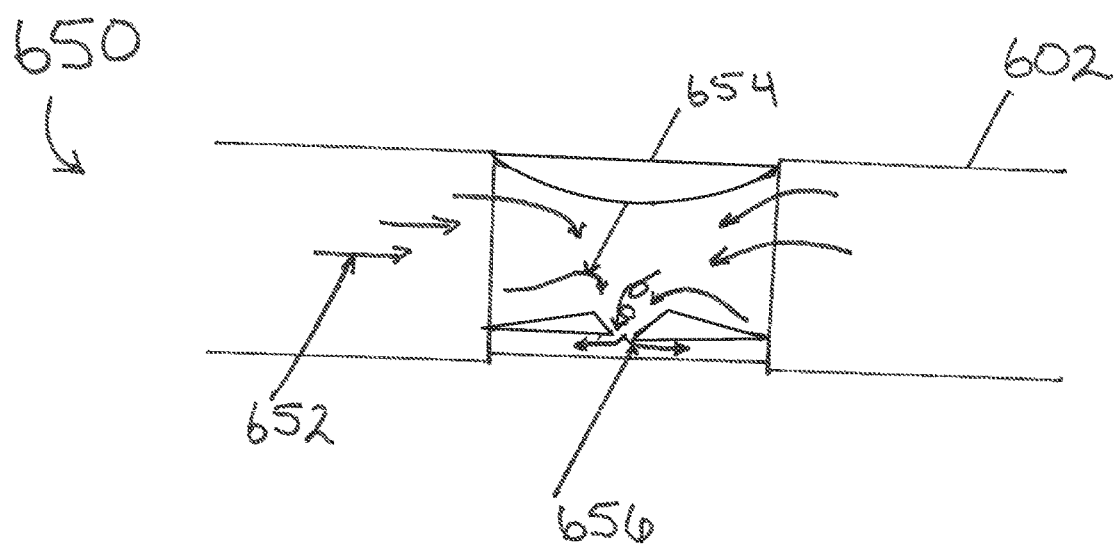
FIG. 6B shows a side view of the coupler of FIG. 6A with a fluid flowing therein, according to one embodiment of the present invention.

FIG. 6B, with reference to FIG. 6A, shows a side view 650 of the coupler or connection component 602 in use with a fluid (e.g., water) flowing therethrough. As illustrated, the fluid initially flows 652 into the coupler or connection component 602 (e.g., from a pipe such as the pipe 604 of FIG. 6A). Upon encountering the ridge stop 618 and the riser 612 and/or shared walls 616, the fluid is directed to flow 654 from the upper tube coupler area 620 to the lower tube coupler area 622. This fluid then flows 656 either back towards its entry (e.g., into a different and smaller cavity of the pipe 604 from what originated the water into the connection component 602) and/or into a cavity (e.g., a smaller of a plurality of cavities) in a second pipe connected at the other end of the coupler or connection component 602.

Figure 7:
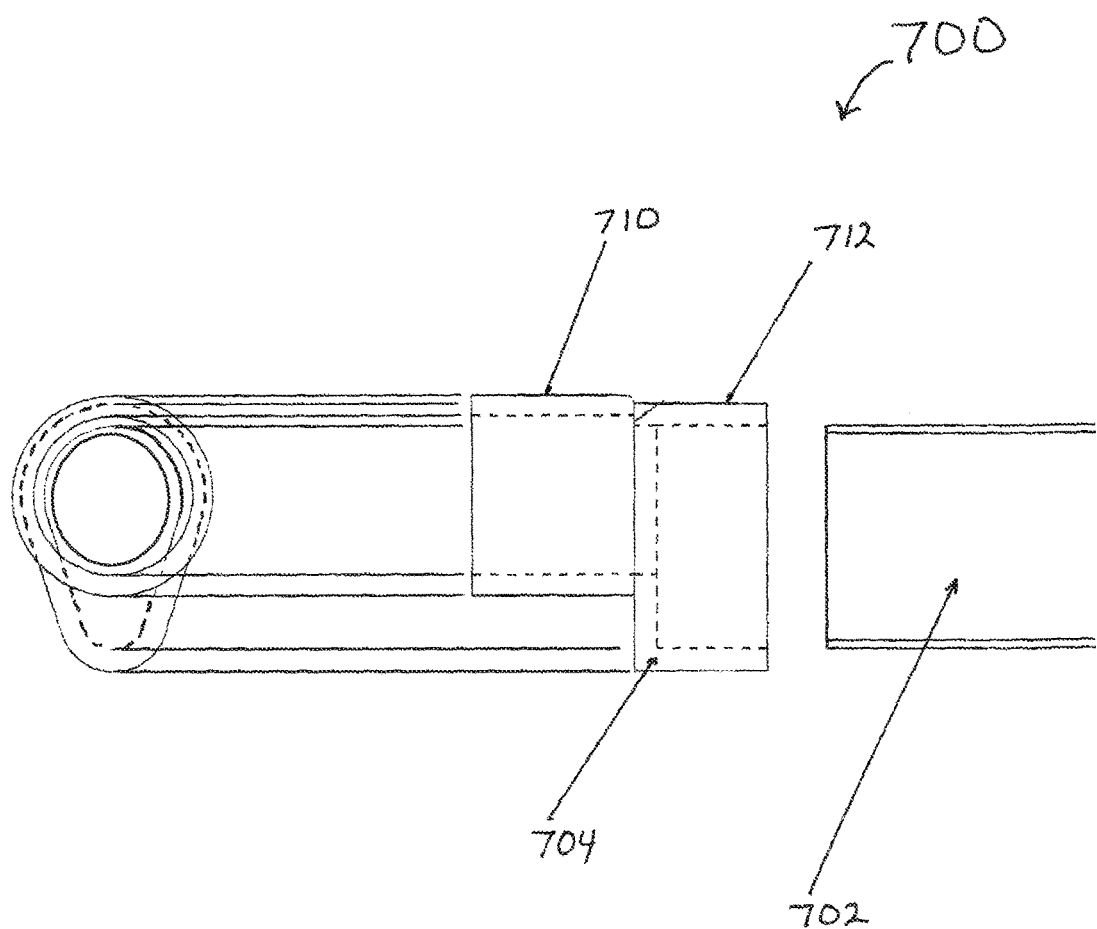
FIG. 7 shows a side view of a system adapter for connection with a pipe, according to one embodiment of the present invention.

In order for fluid to flow through a pipe, such as the pipes discussed throughout, the pipe must be connected with a fluid source. In one embodiment, this may be accomplished via a system adapter that facilitates connection between a fluid source and a pipe. In FIG. 7, a side view 700 of one embodiment of a system adapter 712 is shown. The system adapter 712 may include features that are the same as or similar to those previously discussed. The system adapter 712 may include a fluid source sleeve or connection 710 that includes a hollow portion or cavity therein for fluid to flow through. The system adapter 712 may also include a pipe sleeve or connection 704 that includes a hollow portion or cavity therein for fluid to flow through. The system adapter 712 thus allows fluid to flow from the fluid source sleeve or connection 710 to the pipe sleeve or connection 704. In one embodiment, the system adapter 712 may be configured to connect with a round PVC pipe that flows pressurized fluid (e.g., water, air, nutrients, etc.) into the system adapter 712 via the fluid source sleeve or connection 710.

A pipe 702 (e.g., the same or similar to those previously discussed), may be configured to connect with the pipe sleeve or connection 704 of the system adapter 712. In one embodiment, the pipe 702 may have a plurality of cavities disposed therein and only a few (e.g., one) of those cavities may be permitted to receive any of the fluid directly from the pipe sleeve or connection 704. Thus, in one example, if the pipe 702 has two cavities (one larger and one smaller), only the larger cavity would receive fluid directly from the connection with the pipe sleeve or connection 704. Fluid may be permitted to flow through the second, smaller cavity of the pipe, however, in some embodiments, this may only occur after the fluid has been directed from the larger cavity to the smaller cavity (e.g., via a connection component, the same as or similar to previously discussed). In certain embodiments, fluid may be configured to flow into both of the cavities of the pipe 702 directly from the system adapter 712.

In one embodiment, before fluid enters the pipe 702 from a fluid source, it may pass through a filtered mesh screen (e.g., a 150-mesh screen) to help keep out any particles that may interfere, block, and/or impede the fluid flow. This mesh may be integrated into the pipe 702 at entry and/or at the system adapter 712 and/or another component making up the system.

Figure 8A:
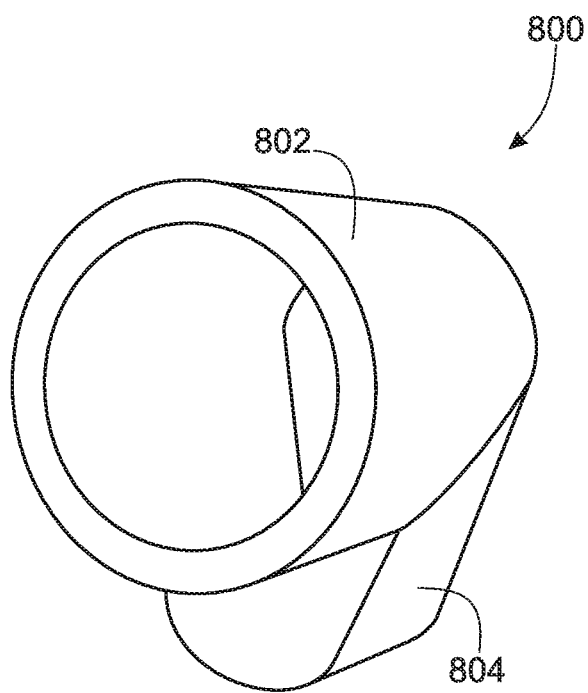
FIG. 8A shows a perspective view of a system adapter for connection with a pipe, according to one embodiment of the present invention.

FIG. 8A shows a perspective view 800 of a system adapter that includes a fluid source sleeve or connection 802 and a pipe sleeve or connection 804. The system adapter may include features that are the same as or similar to those previously discussed. Thus, the system adapter may be configured to connect between a fluid source and a pipe having a plurality of cavities (e.g., two cavities) such that a fluid (e.g., water) is permitted to flow from the fluid source to one of (e.g., a larger) the plurality of cavities of the pipe.

FIG. 8B shows a side view 810 of the system adapter of FIG. 8A. As illustrated, the system adapter has a fluid source sleeve or connection 802 that is connected with the pipe sleeve or connection 804 via a stop ridge 812 for the fluid source and a stop ridge 814 for the pipe or other delivery system. A distance or width 819, from the stop ridge 812 and the stop ridge 814 maintains such distance or width between the pipe (or other delivery system) and the fluid source when both are connected with the system adapter. An angle 818 (e.g., 70 degrees) may be used to connect between the stop ridge 812 and a lower surface that makes up a portion of the pipe sleeve or connection 804.

Figure 8D:
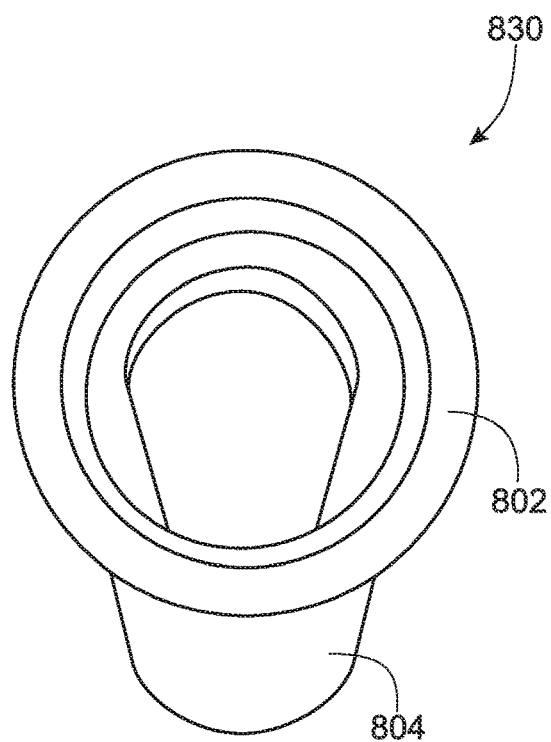
FIG. 8D shows a front view of the system adapter of FIG. 8A, according to one embodiment of the present invention.
Figure 8E:
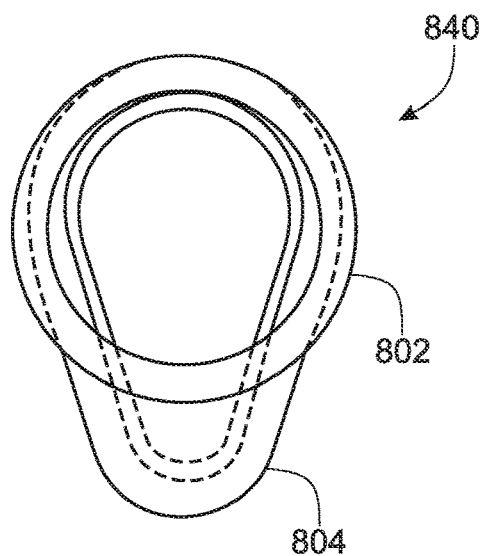
FIG. 8E shows a diagram front view of the system adapter of FIG. 8A, according to one embodiment of the present invention.
Figure 8F:
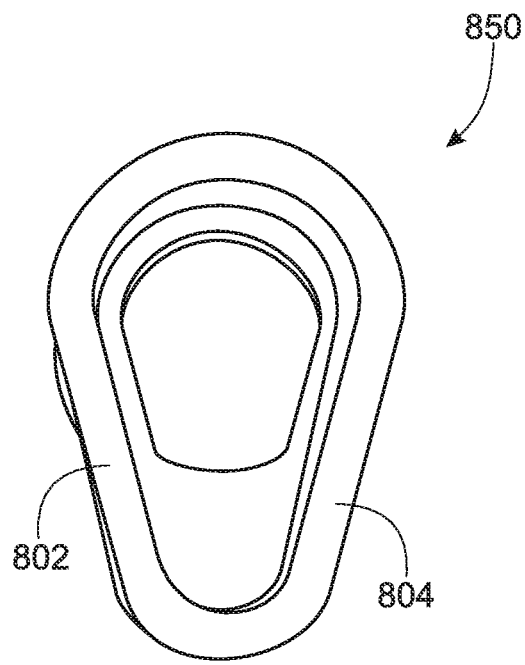
FIG. 8F shows a rear view of the system adapter of FIG. 8A, according to one embodiment of the present invention.
Figure 8G:
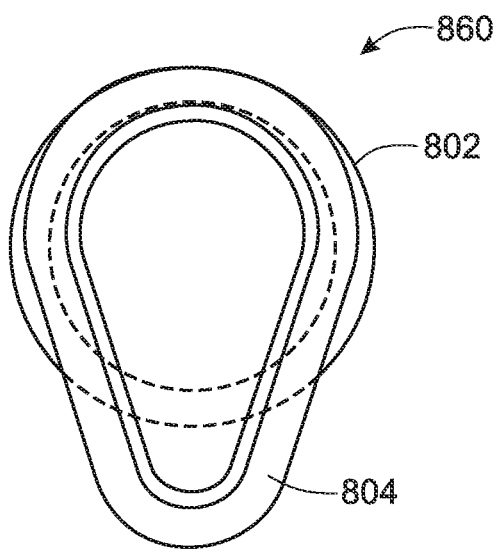
FIG. 8G shows a diagram rear view of the system adapter of FIG. 8A, according to one embodiment of the present invention.
Figure 9:
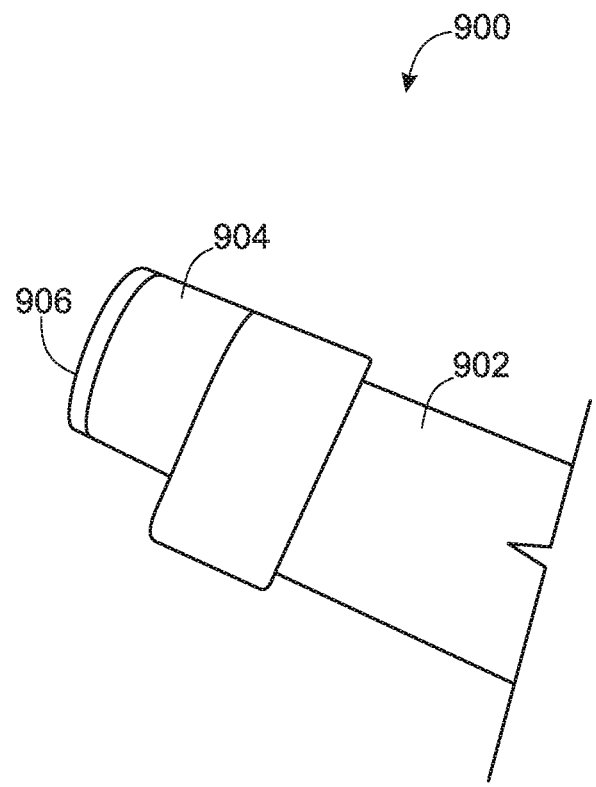
FIG. 9 shows a side view of a system adapter connected with a pipe and an input component, according to one embodiment of the present invention.

FIG. 8C similarly shows a side view 820 of the system adapter of FIG. 8A. As shown and as previously mentioned, a hollow portion 826 within the fluid source sleeve or connection 802 and a hollow portion 828 within the pipe sleeve or connection 804 are at least partially in communication with one another in order to permit fluid transmission. FIGS. 8D and 8E show a front view and a diagram front view, respectively, of the system adapter of FIG. 8A and FIGS. 8F and 8G show a rear view and a diagram rear view, respectively, of the system adapter of FIG. 8A. These illustrations demonstrate, for one embodiment, how a fluid such as water may be permitted to flow from a fluid source to the pipe (e.g., flow only to a larger top cavity of the pipe and not immediately to a smaller, bottom cavity of the pipe). FIG. 9 similarly shows a side view 900 of a system adapter 904 connected with a pipe 902 and having a further input component 906 connected with the system adapter 904. Any of a variety of input components 906 may be connected with or manufactured as part of the system adapter 904 in various embodiments in order to provide a connection to receive fluid to the system adapter from a variety of fluid sources.

Figure 10A:
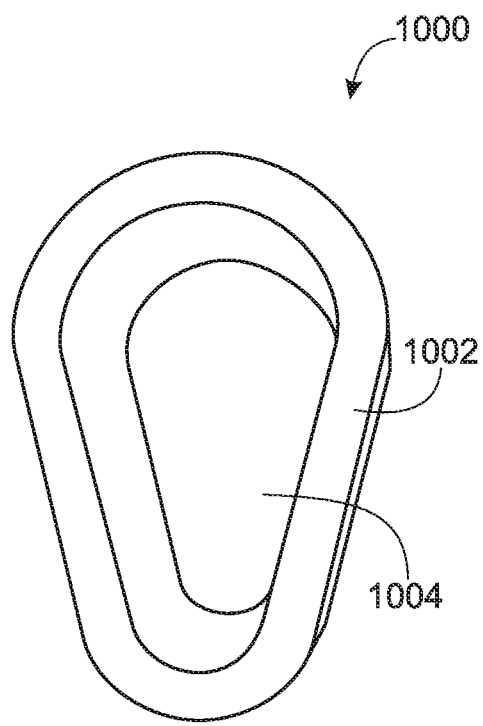
FIG. 10A shows a front view of an end component for a pipe, according to one embodiment of the present invention.
Figure 10B:
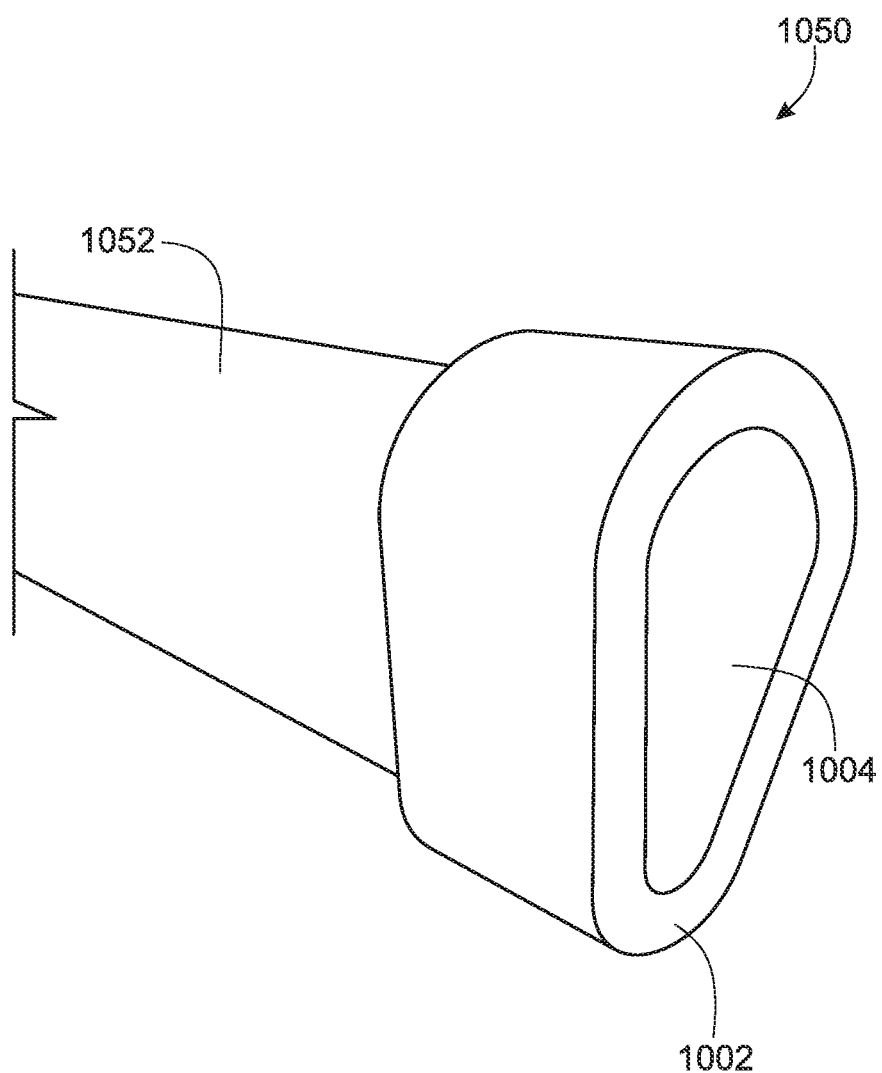
FIG. 10B shows a perspective view of the end component of FIG. 10A connected with a pipe, according to one embodiment of the present invention.

FIG. 10A shows a front view 1000 of an end component 1002 for a pipe. In one embodiment, the end component 1002 may be used to secure fluid within a pipe and/or provide a barrier at an end of a length of pipe such that the fluid is only allowed to exit from the pipe via a desired exit method (e.g., expelled via emitters or holes as previously discussed). The end component 1002 may be a component shaped the same or similarly to that of the pipe it is intended to fit with and contain a filling 1004 that blocks exit of fluid from the pipe. FIG. 10B shows a perspective view 1050 of the end component 1002 having the filling 1004 and connected with an end of a pipe 1052. As seen, any fluid that is flowing within the pipe 1052 would be prevented from leaving the pipe via the end component 1002 due to the filling 1004.

Figure 11:
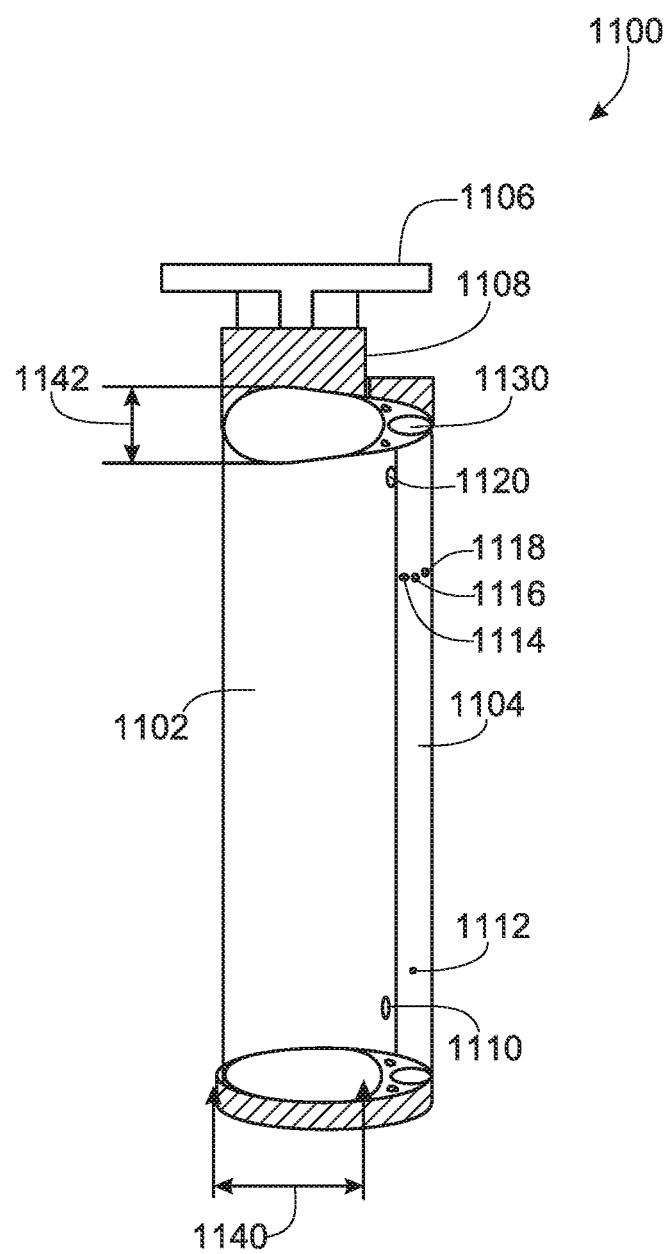
FIG. 11 shows a front view of a vertical fluid delivery system, according to one embodiment of the present invention.

Turning last to FIG. 11, a front view 1100 of a vertical fluid delivery system is shown. In one embodiment, the vertical fluid delivery system may be used for water of deep root vegetation (e.g., trees, bushes, and/or shrubs) that may help tree roots extend downward to follow the water or fluid exiting the delivery system as it gravitates downward into the soil. In certain embodiments, this may help eliminate sidewalk, street, or other surface damage due to trees or other vegetation lifting cement or asphalt that is deposited on top of the soil since the roots are caused to extend away from the soil's surface.

The vertical fluid delivery system may be made out of a 3-pipe system (e.g., PVC), the same or similar to the concepts previously discussed. For example, the same as or similar to previous discussions, a first pipe (e.g., a manifold) 1102 may be placed adjacent to a second pipe (e.g., a delivery tube) 1104, both of them bound together by a third pipe such that the final piping configuration results in a pipe having two cavities, one cavity used as a manifold for flowing fluid and the other cavity used as a delivery tube for subsequently expelling pressurized fluid.

In operation, water or another fluid is configured to enter the manifold 1102 from the top of the vertical fluid delivery system through an adapter 1106 (e.g., connected with a ½ barb tee 1106 or other connection). The water or fluid fills the manifold 1102 and is forced into the delivery tube 1104 through one or more transfer ports (1110, 1120). In one embodiment, the transfer port 1120 may be located 0.500 inches from the top of the vertical fluid delivery system and the transfer port 1110 may be located 0.500 from the bottom edge of the vertical fluid delivery system. The transfer ports (1110, 1120) may be ⁵⁄₁₆ inches in diameter in one embodiment. When the water or fluid is forced into the delivery tube 1104, the differential pressure from the manifold 1102 and the delivery tube 1104 increase the pressure in the delivery tube 1104. The water or fluid is then configured to exit through one or more emitters (1114, 1116, 1118).

In one embodiment, the emitters (1114, 1116, 1118) may be round holes 0.040 in diameter. Moreover, there may be three emitters (1114, 1116, 1118) located near a top portion of the vertical fluid delivery system and configured to spray in the same or in different directions. For example, one of the three emitters (1114, 1116, 1118) may be configured to spray straight, another one of the three emitters (1114, 1116, 1118) may be configured to spray 45 degrees to the left, and another one of the three emitters (1114, 1116, 1118) may be configured to spray 45 degrees to the right. In an alternative embodiment, the emitters may be differently sized and/or shaped, greater or fewer emitters may be used, and/or they may be configured to emit fluid in the same or in any of a variety of different directions. For example, a fourth emitter 1112 is shown near the bottom of the vertical fluid delivery system and may include features that are the same as or similar to those previously discussed.

In certain embodiments, the water or fluid source that charges the vertical fluid delivery system may be from a hose with hose bib or a valve/anti siphon valve. For example, it may use a rigid PVC and/or ½ flexible rubber tubing (e.g., rated at 80psi maximum running pressure). The manifold may be 1 inch in maximum width 1142 and 1.25 inches in maximum length 1140 in one embodiment. In one embodiment, the vertical fluid delivery system may be configured to be placed at a drip line of a mature tree or other vegetation or located 6-8 inches away from a new tree or vegetation. Aeration may occur in the vertical fluid delivery system where after each fluid cycle, the fluid drains from the system and pulls atmosphere into the system replacing the fluid, subsequently expelling the atmosphere out of the system prior to fluid expelling, the same or similar to previous discussions.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and methods. The steps of the method or algorithm may also be performed in an alternate order from those provided in the examples For example, an irrigation system using the concepts disclosed herein may be manufactured with the capability of large amounts of volume per square foot. In certain embodiments, this larger volume may promote greater distances of irrigation since pressure and flow may be lost due to friction of the fluid within the pipe and a larger volume will give more power to emitters that release the water into nearby soil or environment In another example, a cavity or opening in a side wall of one or more components of an irrigation system using the concepts discussed herein (e.g., a cavity within the pipe 302 of FIG. 3) may be used to inject air and/or other nutrients into the fluid (e.g., water) flowing therein. Additional components (e.g., adapters with a ball check valve and an air fitting for connection of plastic tubing, an air compressor etc. may allow only a one way flow through the cavity to help prevent the fluid from leaking out of the system at the cavity. In one embodiment, water may flow at 40-50 psi and the air compressor may be set to 120 psi to break the threshold of the system pressure. This may allow for aeration of the water injecting air, resulting in more aeration in the soil and promoting thicker denser root mass and increasing the yield or growth In another embodiment, an irrigation system using the concepts discussed herein may be configured to drain water after a watering cycle (e.g., as previously discussed for FIG. 3 through utilization of a v-shaped or egg-shaped pipe). In certain embodiments, as the fluid or water drains out of the system, it may pull in the atmosphere and fill the tube or pipe of the irrigation system with air. The irrigation system may then uses the channel in the soil that the emitters have bored out and when the next cycle comes on, the fluid acts as a plunger and pushes the air out the emitters into the soil and then the cycle starts over again. This may aid in permitting multiple fluid cycles during a day (e.g., 30 seconds in duration) to aerate the root zone constantly, which may promote a thicker and/or denser root mass.

In another embodiment, an irrigation system using the concepts discussed herein may utilize air insertion that is charged with a component (e.g., a pipe) that is electrically and/or magnetically charged. For example, this may change the molecular structure of the fluid flowing therein (e.g., water) and make it easier to uptake for vegetation. In one embodiment, such charge may occur immediately before the air is injected into the water. This may also increase the water savings capability of the irrigation system and may be applied to work at low frequencies and at very low intensities.

What is claimed is:

1. An apparatus for irrigating soil with water comprising:
a first pipe for flowing the water therethrough;
a second pipe positioned adjacent to the first pipe;
a third pipe connected around the first pipe and the second pipe for maintaining the first pipe within a predetermined distance from the second pipe;
a coupler configured to engage with a first end of the third pipe including:
a ridge configured to make contact with the first end of the third pipe,
a wall having an opening therein, the opening configured to allow water to flow therethrough;
wherein water in the first pipe is configured to flow into the coupler and through the opening of the wall in order to flow into the second pipe.

2. The apparatus of claim 1 further comprising an emitter in the second pipe or the third pipe for emitting water out of the second pipe.

3. The apparatus of claim 2 wherein the emitter is a hole.

4. An apparatus for irrigating soil comprising:
a first pipe and a second pipe, each pipe having a first cavity and a second cavity, the second cavity smaller in size than the first cavity;
a plurality of emitters in the first and second pipes providing fluid communication between the second cavity and adjacent soil; and
a coupler comprising:
opposing end surfaces configured to engage both the first pipe and the second pipe to place the first and second cavities of the first pipe and the second pipe in fluid communication; and
a transfer area providing fluid communication between the first cavity and the second cavity for transfer of a fluid between the first cavity and the second cavity.

5. The apparatus of claim 4 wherein water in the the first cavity is in serial fluid communication with the second cavity via the transfer area and with the adjacent soil via at least one of the plurality of emitters.

6. The apparatus of claim 5, wherein:
the opposing end surfaces are interior surfaces;
ends of the first pipe and the second pipe are insertable into the interior surfaces; and
the coupler includes an interior ridge between the opposing end surfaces, the interior ridge spacing ends of the first pipe and the second pipe apart to create the transfer area.

7. The apparatus of claim 6, wherein the ridge is 0.4 inches wide.

8. The apparatus of claim 7, wherein the ridge is 0.07 inches high.

9. The apparatus of claim 6, wherein the ridge forms a closed interior circle inside the coupling between the interior surfaces.

10. The apparatus of claim 5, wherein the coupler includes:
a first passage alignable with the first cavity;
a second passage aligned with the second cavity; and
the transfer area comprises a transfer port connecting the first passage with the second passage.

11. The apparatus of claim 10, wherein the first passage tapers to a smaller cross-section on each side of the transfer port.

12. The apparatus of claim 11, wherein the transfer port is a vortex narrowing towards the second cavity.

13. The apparatus of claim 12, wherein the transfer port narrows from 0.4 inches across to 0.375 inches across.

14. The apparatus of claim 5, wherein the emitters are 0.04 inches in diameter.

15. The apparatus of claim 14, wherein the emitters are groups of three angled apart emitters.

16. The apparatus of claim 14, wherein the emitters are spaced 12 inches apart.

17. The apparatus of claim 5, further including an end cap configured to seal both the first cavity and the second cavity.

18. The apparatus of claim 5, further including an adapter to place the first cavity in unrestricted fluid communication with a water source and seal a proximal end of the second cavity.

19. The apparatus of claim 5, wherein water transfer between the first cavity and the second cavity is exclusively through the transfers area of the coupling.

20. An apparatus for irrigating soil comprising:
  a first irrigation pipe segment comprising:
    an outer first pipe having a first interior; and
    a second pipe having a second interior and a third pipe having a third interior, both residing inside the first interior;
  a coupler comprising:
    opposing ends configured to engage the second pipe and the third pipe to place the second interior of the second pipe and the third interior of the third pipe in fluid communication with the second interior of the second pipe and the third interior of the third pipe of a second irrigation pipe segment; and
    a transfer port providing fluid communication between the second interiors and the third interiors for transfer of a fluid between the first interiors and the second interiors; and
  a plurality of emitters in the first and third pipes providing fluid communication between the third interior and adjacent soil.

* * * * *